Figure 1:
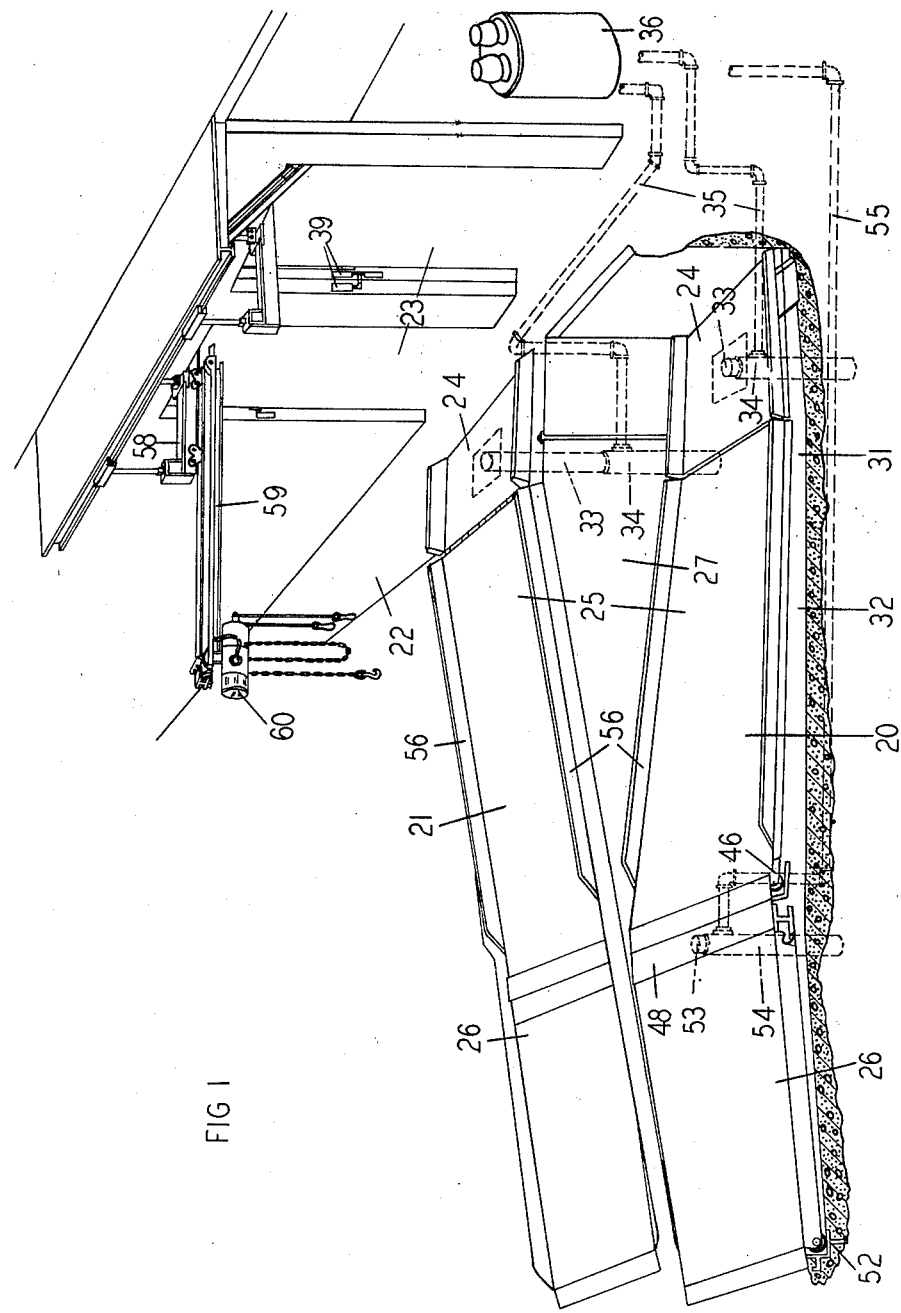

June 23, 1953 I. V. K. HOTT ET AL 2,643,010
LOADING DOCK
Filed Sept. 4, 1945 6 Sheets-Sheet 1

INVENTOR.
ION V. K. HOTT
WILLIAM L. SIMONTON
BY
ATTORNEY.

June 23, 1953     I. V. K. HOTT ET AL     2,643,010
LOADING DOCK
Filed Sept. 4, 1945     6 Sheets-Sheet 2
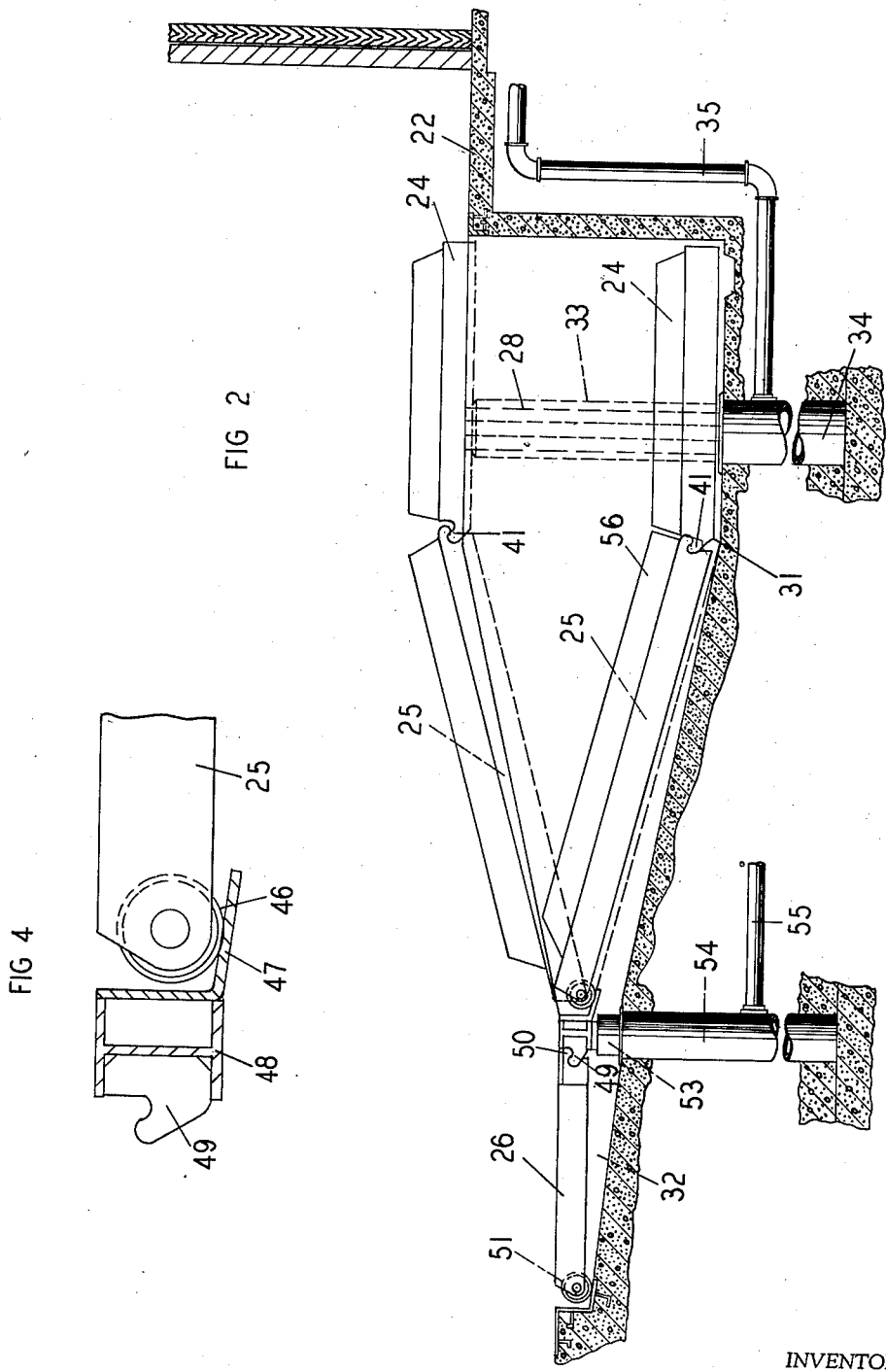
INVENTOR.
ION V. K. HOTT
WILLIAM L. SIMONTON
BY
ATTORNEY.

June 23, 1953 — I. V. K. HOTT ET AL — 2,643,010
LOADING DOCK
Filed Sept. 4, 1945 — 6 Sheets-Sheet 3
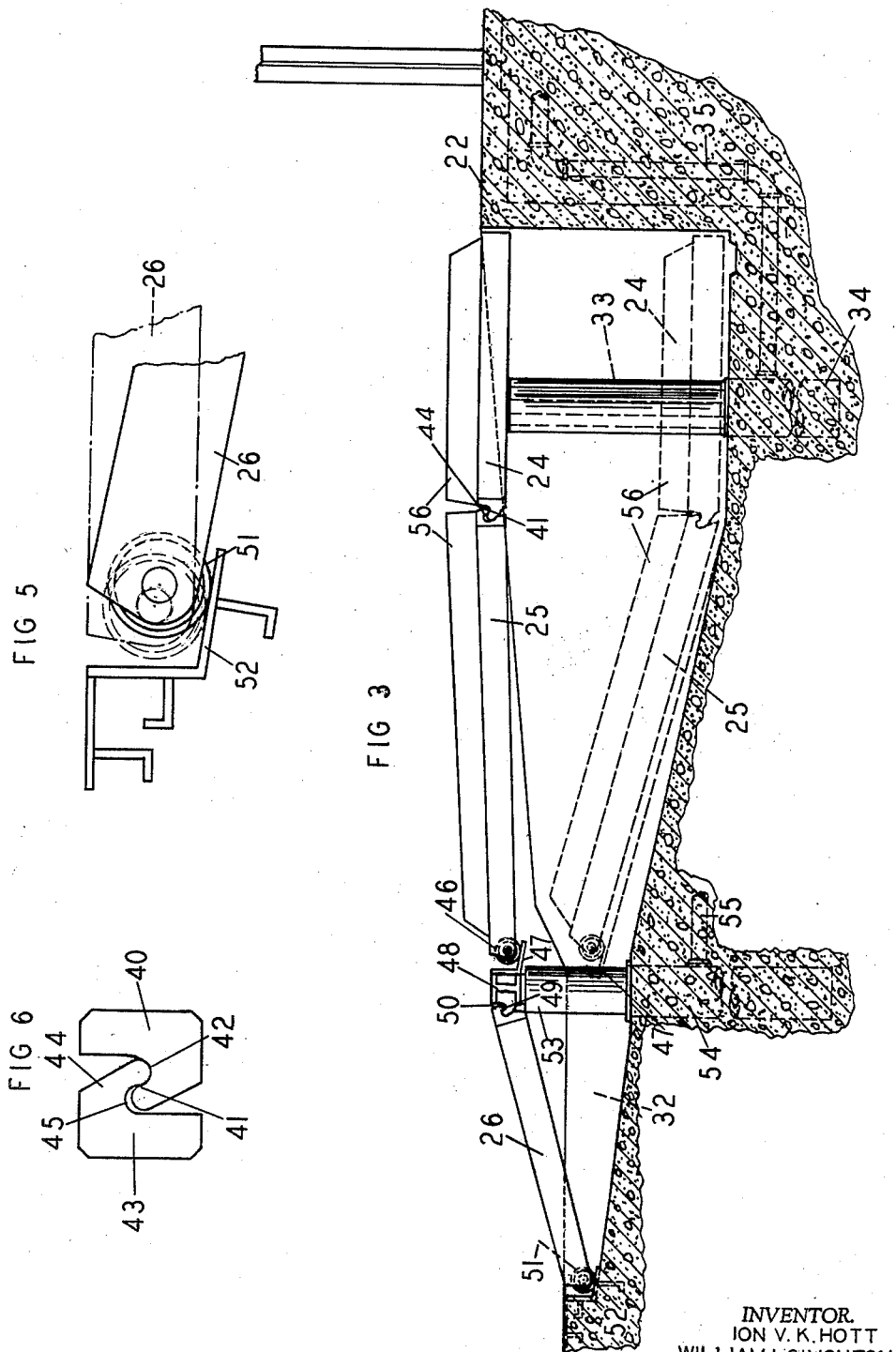
INVENTOR.
ION V. K. HOTT
WILLIAM L. SIMONTON
BY
ATTORNEY.

June 23, 1953     I. V. K. HOTT ET AL     2,643,010
LOADING DOCK
Filed Sept. 4, 1945     6 Sheets-Sheet 4
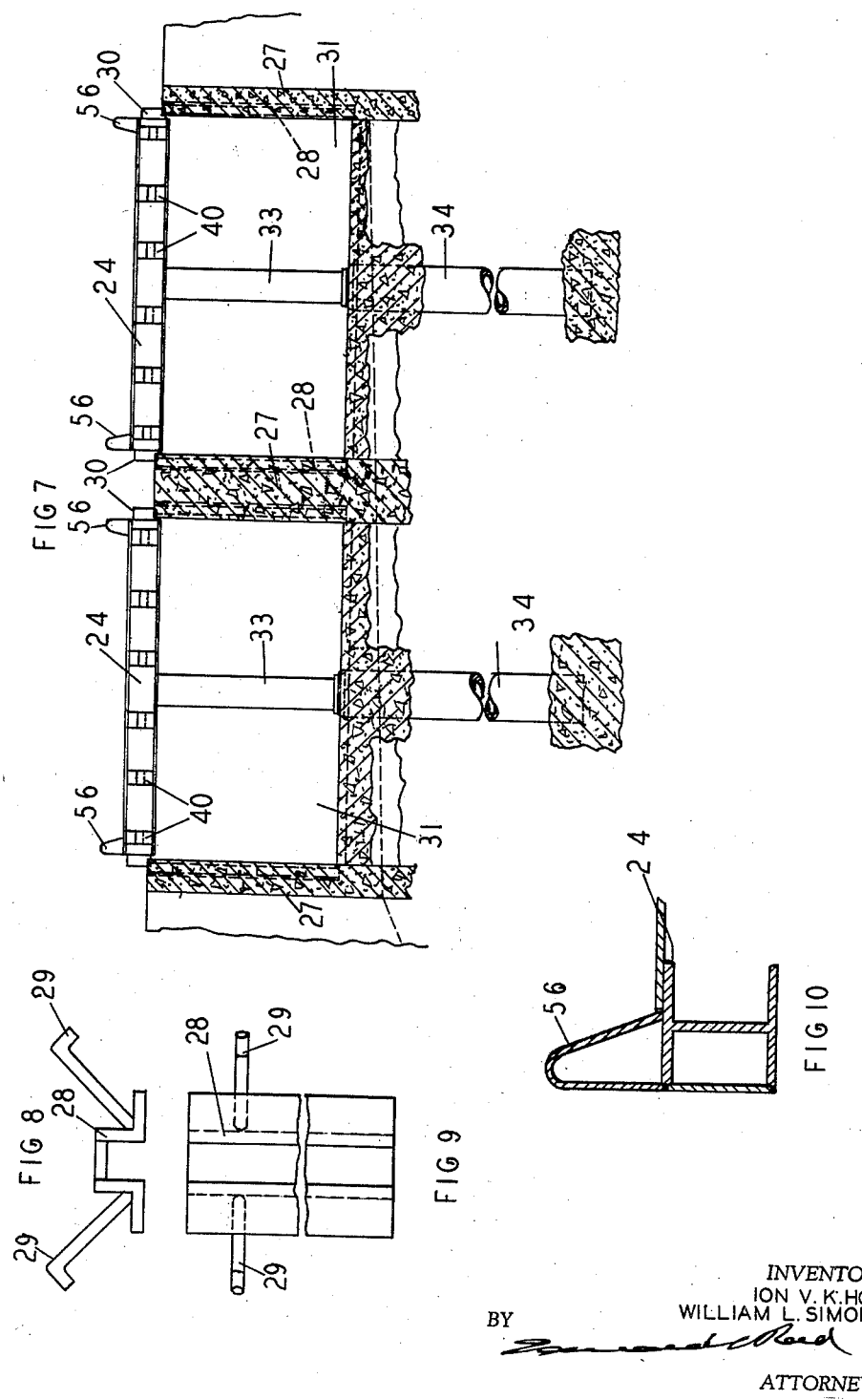
INVENTOR.
ION V. K. HOTT
WILLIAM L. SIMONTON
BY
ATTORNEY.

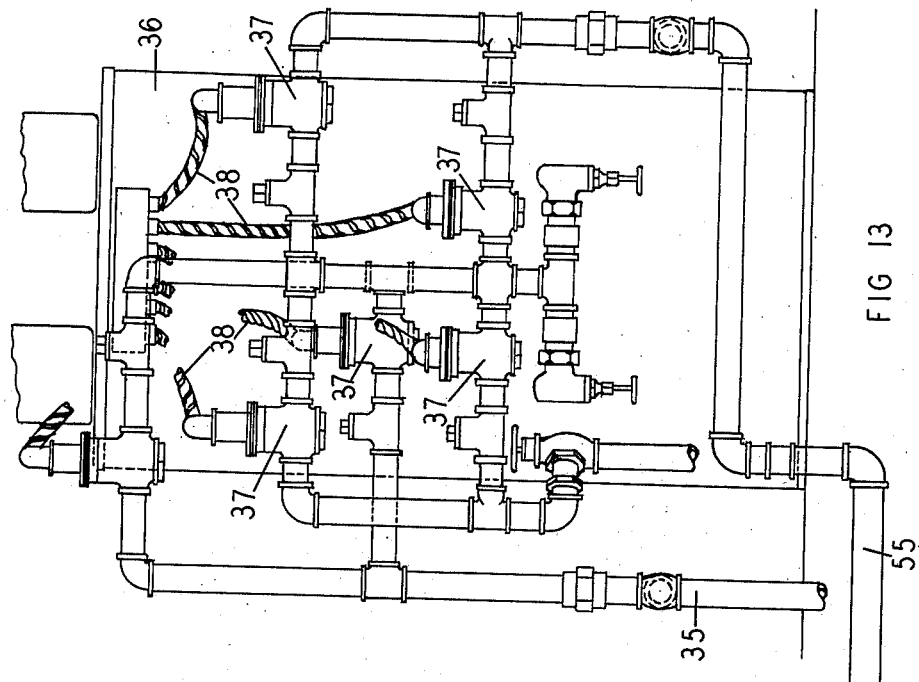
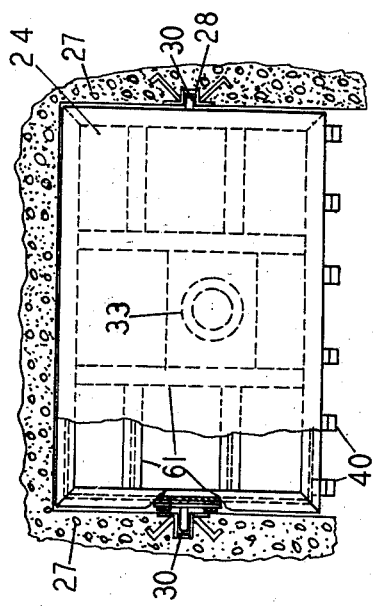
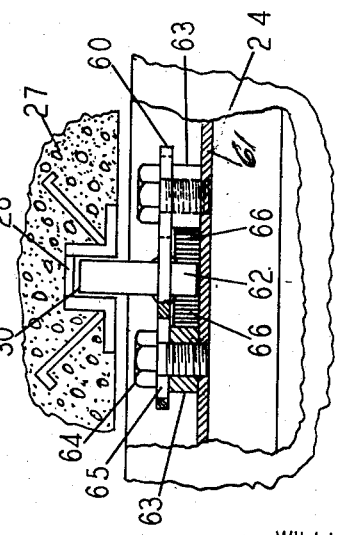

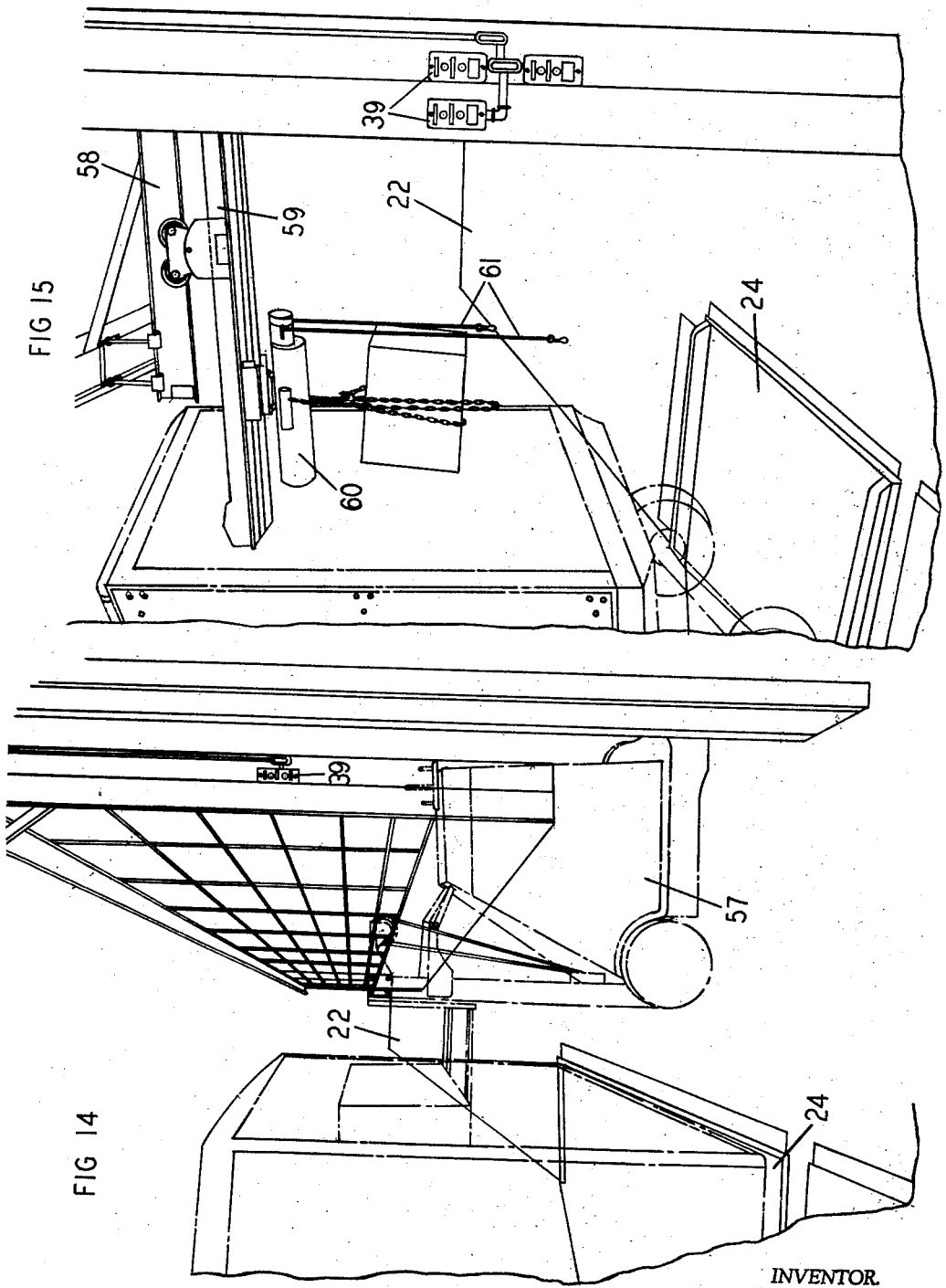

Patented June 23, 1953

2,643,010

UNITED STATES PATENT OFFICE 2,643,010

LOADING DOCK

Ion V. K. Hott and William L. Simonton, Dayton, Ohio, assignors to The Joyce-Cridland Company, Dayton, Ohio, a corporation of Ohio Application September 4, 1945, Serial No. 614,230

9 Claims. (Cl. 214—38)

This invention relates to a loading dock and is intended primarily for loading or unloading trucks or other transport vehicles at factories, warehouses or the like.

One object of the invention is to provide a loading dock which will facilitate and expedite the loading and unloading of trucks.

A further object of the invention is to provide a loading dock which will enable the floor of the truck body to be supported in that position with relation to the loading platform which is best suited for the handling of particular merchandise which is to be loaded or unloaded.

A further object of the invention is to provide a loading dock in which the rear wheels of a truck may be quickly and easily moved onto a vertically movable structure and the floor of the truck adjusted to the desired position with relation to the platform.

A further object of the invention is to provide a loading dock which will support the truck with its floor in a substantially horizontal position when the floor is above the level of the platform.

A further object of the invention is to provide a loading dock including a load hoisting mechanism, in the nature of a traveling crane, which can be moved into and out of the body of the truck when the floor of the latter is above the platform.

Other objects of the invention may appear as the structure is described in detail.

In the accompanying drawings Fig. 1 is a perspective view of a loading dock embodying the invention and including two ramps; Fig. 2 is a side elevation of the installation of Fig. 1, showing the two ramps in different relative positions; Fig. 3 is a similar view showing one of the ramps in a substantially horizontal position; Fig. 4 is a sectional detail view of the connection between the outer end of the inclined portion of the ramp and a support therefor; Fig. 5 is a sectional detail view of the pivotal connection between the third or outermost section of the ramp and a support for the same; Fig. 6 is a detail view of one pair of pivotal connecting elements interposed between adjacent sections of the ramp; Fig. 7 is a transverse sectional view, showing the rear sections of both ramps in elevated positions; Fig. 8 is an end view of one of the guideways for the rear section; Fig. 9 is an elevation of that guideway; Fig. 10 is a sectional detail view showing the guard rail for one of the ramps; Fig. 11 is a transverse section partly broken away showing the rear section of one of the ramps in plan; Fig. 12 is a detail of one of the guides for the rear section; Fig. 13 is an elevation of the receptacle for the pressure fluid which operates the rear sections of the ramps, showing the controlling means therefor; Fig. 14 is a perspective view showing the rear end of a truck body supported with its floor flush with the platform; and Fig. 15 is a similar view showing the truck floor supported above the level of the platform, and a traveling load hoist.

In these drawings we have illustrated one embodiment of our invention and have shown the same as including two separately operated units each comprising a rear section which constitutes a supporting structure adapted to receive and support the rear wheels of a truck which is backed up to the loading platform and which is vertically adjustable to support the rear end of the truck floor in selected vertical positions with relation to the loading platform. An inclined structure is connected at its rear end with the supporting structure for the wheels and extends forwardly, or outwardly, therefrom and the foremost portion thereof remains at or adjacent to the ground or driveway over which the truck moves, thus facilitating the movement of the rear wheels of the truck onto and off of the supporting structure. It is to be understood, however, that the dock as a whole, as well as the several parts thereof, may take various forms without departing from the spirit of the invention. Preferably the dock comprises a ramp extending forwardly from a loading platform and formed of a plurality of sections connected one with the other for relative movement about a transverse axis or axes, so that the rear section or wheel supporting structure may have vertical movement with relation to the forward end of the section which is connected therewith and may be maintained substantially horizontal in all vertically adjusted positions thereof, the forward end of the ramp remaining substantially at ground level and providing a runway over which the rear wheels of the truck may be moved onto the supporting structure. The loading platform with which the ramp is associated may be an exterior structure or it may be the floor of a shipping room from which merchandise is to be removed through a doorway, and it may be at ground level or at any suitable height. When the platform is spaced above the ground or driveway a distance less than the distance between the floor of a standard truck and the ground the wheel supporting structure is mounted in a pit to permit the floor of the truck to be positioned substantially flush with the platform. If the pltaform is of the same height as the floor of a standard truck the pit is not necessary.

The particular installation here illustrated comprises two ramps 20 and 21 but it will be understood that a given installation may include one or any desired number of ramps. The two ramps are identical and a description of one will apply to both and the same reference numerals will be applied to both ramps. Each ramp is arranged with its rear end adjacent to a platform 22 and extends forwardly from that platform. In the present instance the platform is an exterior platform which communicates with the shipping room through doorways 23. The rear portion of the ramp, which receives and supports the rear wheels of the truck is mounted for vertical movement with relation to the fixed platform 22 and in order that it may have vertical movement with relation to the forward portion of the ramp the latter comprises a plurality of sections. The rear section 24 constitutes the rear wheel supporting structure and is pivotally connected with the rear end of a second section 25 the forward end of which is supported for movement about a transverse axis. In the present instance a third section 26 is pivotally connected with the forward end of the second section 25, for a purpose which will hereinafter appear. The rear, or wheel supporting, section of the ramp is supported between the vertical walls 27, preferably of a height approximating the height of the platform and means are provided for guiding this rear section in vertical movement. As here shown, the two walls 27 between which the rear section is mounted are provided with vertical guideways 28, preferably formed of angle irons connected one with the other and embedded in the concrete of which the walls are formed, it being provided with anchors 29 which extend further into the concrete to very rigidly retain the guideway in place. The rear section has at each side thereof guide members here shown in the form of lugs 30 which are slidably mounted in the respective guideways. The positions of the lugs 30 with relation to section 24 are determined when the section is fabricated and the guideways 28 are installed in the concrete walls 27 when the concrete is poured. Consequently it may sometimes happen that the guideways are not accurately positioned with relation to the guide lugs and it is desirable that the lugs should be adjustable transversely to the guideways to so position the same that they will enter the guideways and move vertically therein without binding. For this purpose each lug 30 is secured to and preferably formed integral with a plate 60 which is adjustably mounted on a fixed part of section 24. In the illustrated construction the section comprises a frame formed of a plurality of I-beams 61 and plate 60 is secured to the beam at the adjacent end of the frame. Rigidly secured to, and if desired formed integral with, the inner side of the plate 60 is a second lug 62 which extends inwardly between two horizontally spaced supporting members 63 rigidly secured to the beam 61, the members 63 being here shown as lugs welded to the vertical web of the beam. The plate 60 is adjustably secured to the members 63, as by screws 64 extending through slots 65 in the respective end portions of the plate and threaded into the respective members 63. Shims 66 are inserted between the lug 62 and the member 63 to rigidly brace the lug against the respective members. Thus the guide lug 30 may be adjusted horizontally to accurately position the same with relation to the guideway 28 by removing the plate 60, shifting one or more of the shims from one side of the space which is to receive the lug 62 to the other side of that space and then inserting the lug 62 in that space and again securing the plate 60 to the members 63 in its adjusted position.

In the present installation the loading platform 22 is of a height less than the height of the floor of the body of a standard truck and in order that the rear end of the floor may be moved to a position substantially flush with the platform the ram is mounted in a pit 31 the rear portion of which is of such depth that when the rear section 24 of the ramp is in a lower portion of the pit the floor of the truck will be substantially flush with the platform. The floor 32 of the pit is inclined upwardly and forwardly from the deeper end thereof and, in the present instance, is provided at its forward end with a shallow portion 32, the floor of which is slightly inclined upwardly and forwardly. The walls 27 constitute the side walls of the pit and those portions thereof adjacent the rear section and the second section of the ramp extend above the ground level so that these sections are between the walls in all adjusted positions thereof.

The ramp may be actuated in any suitable manner. Preferably the rear section 24 thereof is supported by and rigidly secured to a ram 33 which is mounted in a cylinder 34 arranged beneath and extending through the floor of the pit. The ram is hydraulically operated and is connected by a conduit 35 with an oil receptacle 36 from which the oil is delivered to the cylinder 34 by a pump or pumps. The flow of the oil to and from the cylinders of the respective rams is controlled by magnetically operated valves 37 which are connected, by conductors extending through conduits 38, with switches 39 mounted adjacent the loading platform where they may be conveniently operated to control the movements of the respective rams. This mechanism for actuating the rams is of a well known type and need not be here shown or described in detail.

The pivotal connections between the several parts of the ramp must be of sufficient strength to support the loaded truck and, as here shown, the connections between the rear section 24 and the second section 25 comprises a plurality of pairs of bearing members, the members of each pair being rigidly connected with the respective sections of the ramp. As shown more particularly in Fig. 6 each pair of bearing members comprises a member 40 of metal rigidly secured to the forward edge of the rear section 24 of the ramp and having a forwardly and upwardly extending part 41 forming between the same and the body of the member 40 a curved bearing recess 42. The second member 43 of each pair is rigidly secured to the rear edge of the second section 25 and has a rearwardly and downwardly extending part 44 forming between the same and the body of the bearing 43 a recess 45 to receive the part 41 of the member 40. The part 44 has a rounded lower end which is seated in the curved recess 42 and the recess 45 of the member 43 is of such depth as to permit the pivotal movement of member 43 with relation to member 40. The forward end of the second section 25 of the ramp is supported for pivotal movement about a transverse axis and for a limited fore and aft movement to compensate for the vertical movement of the rear end thereof. The forward end of the section 25 may rest directly upon a supporting surface but preferably it is provided at its forward end with rollers 46 which rest upon the rearwardly extending flange 47 of an angle iron which is rigidly mounted on a suitable support. When the second section 25 is the foremost section the flange 47 may be rigidly mounted in a concrete bed. However, when the rear wheels of the truck are supported upon the rear section 24 the forward wheels thereof are usually supported on the forward portion of the second section. As a result when the rear section is elevated the intermediate section 25 will be supported in an upwardly and rearwardly inclined position, as shown in Fig. 2, and the truck floor will be correspondingly inclined. It is sometimes desirable that the floor of the truck should be supported in a substantially horizontal position when loading or unloading and for that purpose the third section 26 is provided. Therefore when the third section is used the supporting plate or flange 47 for the forward end of the second section 25 is rigidly secured to a vertically movable support, such as a transverse beam 48 and the rear end of the section 26 is pivotally connected to the support 48, preferably by bearing members 49 and 50 similar to the bearing members 40 and 43 of Fig. 6. The forward end of the section 26 is supported for movement about a vertical axis and for a limited fore and aft movement and, as here shown, is provided with rollers 51 supported on a flange 52 forming a part of supporting member which is partially embedded in and rigidly supported by the concrete outer end wall of the shallow portion 32 of the pit. The supporting structure or beam 48 may be vertically adjusted in any suitable manner and as here shown it is rigidly secured to the upper end of a ram 53 which is mounted in a cylinder 54 arranged beneath and extending through the floor of the shallow portion of the pit, this cylinder being connected by a conduit 55 with the oil receptacle 36 and being controlled separately from the other ram. The front wheels of the truck may rest either on the forward portion of the second section or on the third section, this depending on the length of the truck, and the pivotally connected ends of the second and third sections may be raised either simultaneously with or subsequently to the raising of the rear section 24, thus moving the second section 25 from the upwardly and rearwardly inclined position shown in Fig. 2 to the substantially horizontal position shown in Fig. 3 and the front wheels of the truck being supported either on the forward portion of the section 25 or on the rear portion of the section 26, the floor of the truck will be moved to a substantially horizontal position. In this connection it may be noted that the term "truck," as herein used, is intended to include either a unitary truck in which the motor section is permanently connected with the load supporting section or a trailer in which the load supporting section is separate from the motor section. The truck is moved to loading or unloading position by backing the same onto the ramp and it is preferable that at least the rear and second sections of the ramp should be provided with guard rails, as shown at 56, to prevent the wheels from moving off either side of the ramp.

Thus it will be apparent that, when the truck has been backed onto the ramp, the floor of the truck may be positioned flush with the platform 22, as shown in Fig. 14, so that the merchandise can be carried directly into the body of the truck or may be moved into the same by a small lifting truck 57. In the arrangement here shown the deep portion of the pit 31 is arranged beneath platform 22 and opens through that platform. Thus when the rear section 24 of the ramp has been moved to its elevated position it lies within and forms a part of the platform. When in this position the floor of the truck is supported above the platform and the merchandise may be loaded therein in any suitable manner but preferably a crane type load hoist is provided for moving the merchandise from the shipping room directly into the body of the truck. As shown in Figs. 1 and 15 an overhead track 58 extends forwardly through the doorway to a position adjacent the forward edge of the platform 22. Supported on the fixed track 58 for movement lengthwise thereof is a supplemental track 59 adapted to be extended beyond the fixed track and for a substantial distance into the body of the truck. Mounted on the supplemental track 59 for movement lengthwise thereof is a hoisting mechanism 60 which is preferably operated by an electric motor controlled from either the platform or the truck floor by switch cords 61. Thus the merchandise may be lifted by the hoist within the shipping room and carried thereby substantially to the desired position within the truck body. By providing suitable switching means between the supplemental track 59 and other tracks within the shipping room, in a well known manner, the merchandise can be picked up by the hoisting mechanism in any part of the shipping room.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In combination with a platform and a pit adjacent said platform, a ramp comprising a rear section mounted for vertical movement in said pit and adapted to receive and support the rear wheels of a truck, said pit being of such depth with relation to said platform that when said section of said ramp is in a lower position the floor of said truck will be substantially flush with said platform, said ramp also including a second section pivotally connected with and extending forwardly from said rear section and having its forward end supported for movement about a transverse axis adjacent the top of said pit, and means in said pit to impart vertical movement to said rear section.

2. In combination with a platform and a pit extending forwardly from said platform and having its rear portion below and opening through said platform, a ramp in said pit comprising a rear section mounted for vertical movement in said rear portion of said pit and adapted to receive and support the rear wheels of a truck, said rear portion of said pit being of such depth that when said rear section is near the bottom thereof the floor of said truck will be substantially flush with and will form a part of said platform, said ramp also including a second section pivotally connected with and extending forwardly from said rear section and having its forward end supported for movement about a transverse axis adjacent the top of said pit, and means in said pit to impart vertical movement to said rear section.

3. In combination with a platform and a pit extending forwardly from said platform and having a relatively deep rear portion adjacent said platform and a relatively shallow forward portion, a ramp in said pit comprising a rear section vertically movable in the deep portion of said pit, a forward section supported in the shallow portion of said pit for movement about a transverse axis adjacent its forward end, and an intermediate section, said sections being pivotally connected one with the other for relative movement about transverse axes, and means in said pit for imparting vertical movement to said rear section and to the connected ends of said intermediate and forward sections.

4. In a loading dock, a ramp having a vertically movable rear section to receive and support the rear wheels of a truck and having a second section extending forwardly from said rear section and adapted to support the front wheels of said truck, a plurality of bearing members secured to and facing forwardly from said rear section and each having an upwardly facing bearing recess, a corresponding plurality of bearing members secured to and facing rearwardly from said second section and each having a downwardly extending portion seated in the bearing recess in the corresponding forwardly facing bearing member, and means for supporting said rear section and for imparting vertical movement thereto.

5. In a loading dock, a ramp comprising a rear section adapted to be mounted adjacent a platform for vertical movement with relation thereto, a power operated lifting element arranged below and connected with said rear section to move the latter to and support the same in a position below the level of said platform in which position the rear wheels of a truck may be moved onto and supported by said rear section, with the rear end of the floor of said truck substantially at the level of said platform, said rear section and said wheels being movable by said lifting element to a position adjacent the level of said platform in which position the rear end of the floor of said truck is spaced a substantial distance above said platform, a second section extending forwardly from said rear section and forming a runway over which said rear wheels may be moved onto said rear section, and means for connecting the rear end of said second section with said rear section for vertical movement therewith and for movement about a transverse axis with relation thereto, the forward end of said second section being supported for movement about a transverse axis and for fore and aft movement by the vertical movement of the rear end thereof.

6. In a loading dock, a platform, a pit below the level of said platform and extending forwardly therefrom, a ramp in said pit including a vertically movable rear section adjacent said platform, a power operated lifting element in the bottom of said pit and connected with said rear section to support the latter in the lower portion of said pit in a position in which the rear wheels of a truck may be moved onto and supported by of said truck adjacent the level of said platform, said rear section with the rear end of the floor said rear section and said wheels being movable by said lifting element to a position in which the rear end of the floor of said truck is positioned a substantial distance above the level of said platform, said ramp having a second section extending forwardly from said rear section and adapted to receive and support the front wheels of said truck, and means for connecting the rear end of said second section with said rear section for vertical movement therewith and for movement about a transverse axis with relation thereto, the forward end of said second section being supported for fore and aft movement and for movement about a transverse axis in a horizontal plane between the upper and lower limits of movement of said rear section, whereby said second section is moved to different inclined positions by the vertical movement of said rear section.

7. In a loading dock, a ramp adapted to be mounted adjacent to a loading platform and to extend forwardly therefrom, said ramp comprising a non-tiltable rear section supported normally below the level of said platform and adapted to receive and support the rear wheels of a truck, a second section pivotally connected with said rear section, extending forwardly therefrom and adapted to support the front wheels of said truck, means normally connected with said rear section for moving said rear section and the rear end of said second section upwardly to the level of said platform, normally stationary means for supporting the forward end of said second section, means for moving said forward end of said second section upwardly, and separate means for controlling the upward movement of said rear section and the forward end of said second section.

8. In a loading dock, a ramp adapted to be mounted adjacent to a loading platform and to extend forwardly therefrom, said ramp comprising a non-tiltable rear section supported normally below the level of said platform and adapted to receive and support the rear wheels of a truck, a second section pivotally connected with said rear section and extending forwardly therefrom and adapted to support the front wheels of said truck, means normally connected with said rear section for moving said rear section and the rear end of said second section upwardly to the level of said platform, normally stationary means for supporting the forward end of said second section, a third section connected with the forward end of said second section for pivotal movement with relation thereto about a transverse axis, said third section extending forwardly from said second section and being movably supported at its forward end, and means for simultaneously imparting upward movement to the connected ends of said second and third sections.

9. In a loading dock, a ramp adapted to be mounted adjacent to a loading platform and to extend forwardly therefrom, said ramp comprising a non-tiltable rear section supported normally below the level of said platform and adapted to receive and support the rear wheels of a truck, a second section pivotally connected with said rear section and extending forwardly therefrom and adapted to support the front wheels of said truck, means normally connected with said rear section for moving said rear section and the rear end of said second section upwardly to the level of said platform, a normally stationary structure supporting the forward end of said second section, a third section pivotally connected with and supported by said structure and movably supported at its forward end, and means for imparting upward movement to said structure.

ION V. K. HOTT.
WILLIAM L. SIMONTON.

References Cited in the file of this patent

UNITED STATES PATENTS

| Number | Name | Date |
|---|---|---|
| 871,120 | Holmes | Nov. 19, 1907 |
| 963,918 | Miller | July 12, 1910 |
| 1,112,543 | Love | Oct. 6, 1914 |
| 1,164,143 | Swift | Dec. 14, 1915 |
| 1,207,226 | Schilling | Dec. 5, 1916 |
| 1,279,967 | Barlow | Sept. 24, 1918 |
| 1,485,302 | Sharp | Feb. 26, 1924 |
| 1,564,190 | Anderson | Dec. 8, 1925 |
| 1,566,490 | Lindquist | Dec. 22, 1925 |
| 1,577,185 | Fitch | Mar. 16, 1926 |
| 1,678,528 | Perin | July 24, 1928 |
| 1,730,645 | Cory | Oct. 8, 1929 |
| 1,783,021 | Leach | Nov. 25, 1930 |
| 1,879,607 | Fitch | Sept. 27, 1932 |
| 2,168,061 | Christie et al. | Aug. 1, 1939 |
| 2,449,829 | Agren | Sept. 21, 1948 |

FOREIGN PATENTS

| Number | Country | Date |
|---|---|---|
| 31,948 | Denmark | June 28, 1923 |